United States Patent
Kaneta et al.

(10) Patent No.: US 12,270,148 B2
(45) Date of Patent: Apr. 8, 2025

(54) SIZING AGENT, REINFORCEMENT FIBER TOW, FIBER-REINFORCED RESIN-MOLDING MATERIAL, AND FIBER-REINFORCED COMPOSITE MATERIAL

(71) Applicant: Mitsubishi Chemical Corporation, Tokyo (JP)

(72) Inventors: Kenji Kaneta, Tokyo (JP); Kouki Wakabayashi, Tokyo (JP); Tsuyoshi Takada, Tokyo (JP); Hiroyuki Nakao, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 759 days.

(21) Appl. No.: 17/130,546

(22) Filed: Dec. 22, 2020

(65) Prior Publication Data

US 2021/0108363 A1 Apr. 15, 2021

Related U.S. Application Data

(63) Continuation of application No. PCT/JP2019/025530, filed on Jun. 27, 2019.

(30) Foreign Application Priority Data

Jun. 29, 2018 (JP) ................................ 2018-123885

(51) Int. Cl.
| | | |
|---|---|---|
| *D06M 15/55* | (2006.01) | |
| *C01B 32/05* | (2017.01) | |
| *C08J 5/04* | (2006.01) | |
| *C08J 5/06* | (2006.01) | |
| *C08J 5/24* | (2006.01) | |
| *D06M 13/224* | (2006.01) | |
| *D06M 101/40* | (2006.01) | |

(52) U.S. Cl.
CPC ............. *D06M 15/55* (2013.01); *C01B 32/05* (2017.08); *C08J 5/042* (2013.01); *C08J 5/06* (2013.01); *C08J 5/248* (2021.05); *D06M 13/224* (2013.01); *D06M 2101/40* (2013.01)

(58) Field of Classification Search
CPC .................................................... D06M 15/55
See application file for complete search history.

(56) References Cited

U.S. PATENT DOCUMENTS

2004/0191511 A1* 9/2004 Sugiura
2015/0210813 A1* 7/2015 Arai ..................... C08K 5/1515
428/298.7

FOREIGN PATENT DOCUMENTS

| CA | 3023480 | A1 | | 12/2017 | | |
|---|---|---|---|---|---|---|
| CN | 104389177 | A | | 3/2015 | | |
| EP | 436377 | A | * | 7/1991 | ............. | D01F 11/14 |
| EP | 0436377 | A2 | | 7/1991 | | |
| EP | 3195994 | A1 | | 7/2017 | | |
| JP | 60-104578 | A | | 6/1985 | | |
| JP | 07-197381 | A | | 8/1995 | | |
| JP | 09-250087 | A | | 9/1997 | | |
| JP | 2002-255448 | A | | 9/2002 | | |
| JP | 2002-317383 | A | | 10/2002 | | |
| JP | 2007-126637 | A | | 5/2007 | | |
| JP | 2008-274520 | A | | 11/2008 | | |
| JP | 2010-163536 | A | | 7/2010 | | |
| JP | 2011-241494 | A | | 12/2011 | | |
| JP | 2014028905 | A | * | 2/2014 | | |
| JP | 2016-160549 | A | | 9/2016 | | |
| WO | WO-2015045618 | A1 | * | 4/2015 | ........... | C08G 63/676 |

OTHER PUBLICATIONS

English machine translation of Hashimoto et al. (WO 2015/045618). (Year: 2015).*
English machine translation of Ishikawa et al. (JP 2014-28905) were used for citation. (Year: 2014).*
JER Epoxy Resin.*
Office Action dated Apr. 29, 2023, issued in corresponding Chinese Patent Application No. 201980042170.7.
International Search Report issued in corresponding International Patent Application No. PCT/JP2019/025530, dated Oct. 1, 2019.
Office Action issued in corresponding Japanese Patent Application No. 2019-538689, dated Apr. 21, 2020.
First Office Action issued in corresponding Chinese Patent Application No. 2019800421707, dated Aug. 31, 2022.
Extended European Search Report (EESR) issued in corresponding European Patent Application No. 19825283.5, dated Aug. 11, 2021.
Office Action dated Feb. 16, 2024 issued in European Patent Application No. 19825283.5.
Office Action dated Jan. 14, 2025 issued with corresponding Mexican Patent Application No. MX/a/2020/014254 with the English translation.

\* cited by examiner

*Primary Examiner* — Michael F Pepitone
(74) *Attorney, Agent, or Firm* — Morgan, Lewis & Bockius LLP

(57) ABSTRACT

A sizing agent is provided, the sizing agent includes a component (A) and a component (B), wherein a mass ratio A/B of the component (A) to the component (B) is 0.5 to 20, and a proportion of a total mass of the component (A) and the component (B) with respect to a total mass of the sizing agent is 80% by mass or more, wherein the component (A) is an epoxy resin having a viscosity of 1 to 180,000 Pa·s at 30° C., and the component (B) is an aliphatic ester compound having a freezing point of 50° C. or lower.

21 Claims, No Drawings

SIZING AGENT, REINFORCEMENT FIBER TOW, FIBER-REINFORCED RESIN-MOLDING MATERIAL, AND FIBER-REINFORCED COMPOSITE MATERIAL

This application is a continuation filing of, and claims priority under 35 U.S.C. § 111(a) to, International Application No. PCT/JP2019/025530, filed on Jun. 27, 2019, and claims priority therethrough under 35 U.S.C. § 119 to Japanese Patent Application No. 2018-123885, filed on Jun. 29, 2018, the entireties of which are incorporated herein by reference.

BACKGROUND OF THE INVENTION

Field of the Invention

The present invention relates to a sizing agent, a reinforcement fiber tow, a fiber-reinforced resin-molding material, and a fiber-reinforced composite material.

Description of the Related Art

Carbon fiber-reinforced composite materials obtained from a molding material comprising carbon fibers as reinforcement fibers are widely used in various fields due to the light weight and high strength thereof. As the molding material, a sheet-molding compound (SMC) using short fibers, a prepreg using continuous fibers, and the like are known. Since an SMC has excellent fluidity, it is suitable for forming complex shapes which are difficult to form with a prepreg.

In a case where short fibers are used, it is known that the mechanical properties of the composite material are strongly influenced by the dispersed state and shape of the short fibers in the composite material. Since the manufacturing cost of carbon fibers is comparatively high, a plurality of fibers may be bundled into a carbon fiber tow, but the more fine fiber tows are dispersed in the composite material, the better the mechanical properties of the composite material are. Therefore, the use in SMC manufacturing of carbon fiber tows, which comprise a plurality of sub-tows in which each sub-tow is separated and dispersed when chopped (cut), is known. For example, Patent Literature 1 proposes chopping a carbon fiber tow wound on a single bobbin without aligning a plurality of fiber tows (sub-tows) for use in SMC manufacturing. However, since the sub-tows of such a carbon fiber tow are not sufficiently integrated with each other, a portion of the sub-tows may separate during manufacturing or processing of the carbon fiber tow, and winding or the like around a roll or the like may occur.

Here, a method is proposed in which a sizing agent is attached to a reinforcement fiber tow such as a carbon fiber tow to improve higher-order processability such as scratch resistance and chopping property. For example, Patent Literature 2 proposes improving higher-order processability by applying a sizing agent having a specific component on a carbon fiber tow.

SUMMARY OF INVENTION

Technical Problem

In a case of bundling a reinforcement fiber tow comprising a plurality of sub-tows with a sizing agent, it is necessary to use a sizing agent having a high bundling property in order to obtain an excellent chopping property. However, when the sub-tows are bonded to each other with a sizing agent having a high bundling property, easiness of separation upon chopping of the reinforcement fiber tow (hereinafter also referred to as separation property) decreases and separation between the sub-tows tends to be insufficient. On the other hand, when the amount of the sizing agent is reduced or a sizing agent having a low bundling property is used in order to secure the separation property, the chopping property is lowered and, in particular, in a case where carbon fibers are used as the reinforcement fibers, a single filaments of carbon fiber may be separated from one sub-tow and entangled with another sub-tow and the separation property may also be lowered.

The present invention has an object of providing a sizing agent capable of achieving both an excellent chopping property and separation property when chopping a reinforcement fiber tow, a reinforcement fiber tow capable of achieving both an excellent chopping property and separation property during chopping, a fiber-reinforced resin-molding material, and a fiber-reinforced composite material.

Solution to Problem

The problems described above are solved by the following invention.

[1] A sizing agent includes a component (A), and a component (B), in which a mass ratio A/B of the component (A) to the component (B) is 0.5 to 20, and a proportion of a total mass of the component (A) and the component (B) with respect to a total mass of the sizing agent is 80% by mass or more, in which the component (A) is an epoxy resin having a viscosity of 1 to 180,000 Pa·s at 30° C., the component (B) is an aliphatic ester compound having a freezing point of 50° C. or lower.

[2] The sizing agent according to [1], in which the component (A) is blended with an epoxy resin having a softening point of 50° C. or higher.

[3] The sizing agent according to [1] or [2], in which the component (B) comprises an aliphatic ester compound having one or two ester bonds in a molecule.

[4] A reinforcement fiber tow comprising a plurality of sub-tows bonded to each other with the sizing agent according to any one of [1] to [3].

[5] The reinforcement fiber tow according to [4], in which an amount of the sizing agent is 0.6 to 1.6% by mass with respect to a total mass of the reinforcement fiber tow.

[6] A reinforcement fiber tow, which is a continuous reinforcement fiber tow, comprising a plurality of sub-tows bonded to each other with a sizing agent, in which a proportion Q of a separation property as defined below is 20% or more, (Proportion Q)

A continuous reinforcement fiber tow is chopped (cut) at a length of 1 inch, and 100 pieces of the chopped reinforcement fiber tows, each of which does not include any unsplit portion between the sub-tows, are carefully picked up with a pair of tweezers at random, a mass of each is measured, and from these 100 mass measurement values, the number of chopped reinforcement fiber tows corresponding to a mass of the sub-tow is counted, and the proportion Q of the number is calculated.

[7] The reinforcement fiber tow according to [6], in which the proportion Q is 40% or more.

[8] The reinforcement fiber tow according to any one of [4] to [7], in which the reinforcement fiber tow is a carbon fiber tow.

[9] The reinforcement fiber tow according to any one of [4] to [8], in which adjacent sub-tows in the plurality of sub-tows are in an intermittently split state.

[10] A fiber-reinforced resin-molding material in which a fiber tow resulting from cutting the reinforcement fiber tow according to any one of [4] to [9] at an interval in a longitudinal direction is impregnated with a resin.

[11] The fiber-reinforced resin-molding material according to [10], which is a sheet-molding compound.

[12] A fiber-reinforced composite material which is molded from the fiber-reinforced resin-molding material according to [10] or [11].

Advantageous Effects of Invention

According to the present invention, it is possible to provide a sizing agent capable of achieving both an excellent chopping property and separation property when chopping a reinforcement fiber tow, a reinforcement fiber tow capable of achieving both an excellent chopping property and separation property during chopping, a fiber-reinforced resin-molding material, and a fiber-reinforced composite material.

DETAILED DESCRIPTION OF THE INVENTION

[Sizing Agent]

The sizing agent of the present invention is includes the component (A) and the component (B) described below.

<Component (A)>

The component (A) is an epoxy resin having a viscosity of 1 to 180,000 Pa·s at 30° C. Here, the viscosity of the epoxy resin is the viscosity measured according to JIS Z 8803: 2011 "Viscosity measurement method using a cone-plate rotational viscometer".

The viscosity of the epoxy resin, which is the component (A), at 30° C. is not particularly limited when in a range of 1 to 180,000 Pa·s.

When the viscosity of the epoxy resin as the component (A) is in this range, the chopping property and separation property of the reinforcement fiber tow (in particular, the carbon fiber tow), in which a plurality of sub-tows are bonded with the sizing agent of the present invention, during chopping are excellent.

The lower limit of the viscosity of the epoxy resin as the component (A) is preferably 500 Pa·s or more and more preferably 4000 Pa·s or more since the reinforcement fiber tow (in particular, the carbon fiber tow), in which a plurality of sub-tows are bonded with the sizing agent of the present invention, has a superior chopping property during chopping.

The upper limit of the viscosity of the epoxy resin as the component (A) is preferably 150,000 Pa·s or less, and more preferably 120,000 Pa·s or less since the reinforcement fiber tow (in particular, the carbon fiber tow), in which a plurality of sub-tows are bonded with the sizing agent of the present invention, has a superior separation property during chopping.

As the numerical range of the viscosity of the epoxy resin as the component (A), for example, 500 to 150,000 Pa·s is preferable, and 4000 to 120,000 Pa·s is more preferable. When the viscosity is in this range, the chopping property and the separation property of the reinforcement fiber tow (in particular, the carbon fiber tow), in which a plurality of sub-tows are bonded with the sizing agent of the present invention, during chopping are superior.

It is possible to adjust the viscosity of the epoxy resin which is the component (A) through the type, combination, and blending ratio of the epoxy resin used.

The component (A) may be any epoxy resin having a viscosity at 30° C. of 1 to 180,000 Pa·s and one type of epoxy resin may be used alone, or two or more types of epoxy resins may be used in combination.

The component (A) preferably comprises an epoxy resin having a softening point of 50° C. or higher.

When the component (A) comprises an epoxy resin having a softening point of 50° C. or higher, the frictional resistance between the reinforcement fibers (in particular, carbon fibers) is reduced.

In a case where an epoxy resin having a softening point of 50° C. or higher is used as the component (A), it is possible to mix and adjust an epoxy resin having a softening point of less than 50° C. such that the viscosity is within the range described above.

The component (A) preferably comprises an epoxy resin having a softening point of 50° C. or higher and an epoxy resin staying in liquid state at 30° C., and more preferably comprises an epoxy resin having a softening point of 50 to 100° C. The component (A) more preferably comprises an epoxy resin having a viscosity at 30° C. of 1 to 100 Pa·s, and even more preferably comprises an epoxy resin having a viscosity at 30° C. of 10 to 100 Pa·s.

The epoxy resin having a softening point of 50° C. or higher is, for example, a bisphenol A novolak type epoxy resin, a phenol novolak type epoxy resin, or a dicyclopentadiene type epoxy resin. The epoxy resin having a softening point of 50° C. or higher is preferably a bisphenol A novolak type epoxy resin, which is a polyfunctional epoxy resin.

The epoxy resin having a softening point of lower than 50° C. is, for example, a bisphenol F type epoxy resin and a bisphenol A type epoxy resin. The epoxy resin having a softening point of lower than 50° C. is preferably a bisphenol F type epoxy resin having a low viscosity among aromatic epoxy resins.

Possible examples of the epoxy resin having a softening point of 50 to 100° C. include jER157S70 (softening point: 70° C.), jER1032H60 (softening point: 62° C.), and jER1031S (softening point: 92° C.) manufactured by Mitsubishi Chemical Corporation as bisphenol A novolak type epoxy resins; EPICLON N-770 (softening point: 65 to 75° C.), EPICLON N-775 (softening point: 70 to 80° C.), and EPICLON N-865 (softening point: 64 to 72° C.) manufactured by DIC Co., Ltd., as phenol novolak type epoxy resins; EPICLON HP-7200L (softening point: 50 to 60° C.), EPICLON HP-7200 (softening point: 56 to 66° C.), EPICLON HP-7200H (softening point: 78 to 88° C.), and EPICLON HP-7200HH (softening point: 88 to 98° C.), manufactured by DIC Co., Ltd., as dicyclopentadiene type epoxy resins; JER1001 (softening point 64° C.), jER1002 (softening point 78° C.), jER1003 (softening point 89° C.), jER1055 (softening point 93° C.), jER1004 (softening point 97° C.), jER1004AF (softening point 97° C.), and JER1003F (softening point 96° C.), manufactured by Mitsubishi Chemical Corporation as bisphenol A type epoxy resins; and jER4005P (softening point 87° C.) manufactured by Mitsubishi Chemical Corporation as a bisphenol F type epoxy resin.

Examples of the epoxy resin staying in liquid state at 30° C. include jER825, jER827, jER828, jER828EL, jER828US, and jER828XA manufactured by Mitsubishi Chemical Corporation, or EPICLON 840, EPICLON 840-S, EPICLON 850, EPICLON 850-S, and EPICLON EXA-850CRP manufactured by DIC Co., Ltd., as bisphenol A type epoxy resins; and JER806, jER806H, and jER807 manufactured by Mitsubishi Chemical Corporation, and EPICLON 830, EPICLON 830-S, EPICLON 835, and EPICLON EXA-830CRP manufactured by DIC Co., Ltd., as bisphenol F type epoxy resins; and jER152 manufactured by Mitsubishi Chemical Corporation as a phenol novolak type epoxy resin.

Examples of the epoxy resins having a viscosity at 30° C. of 10 to 100 Pa·s include jER828 (viscosity at 30° C.: 10 to 15 Pa·s), jER828EL (viscosity at 30° C.: 10 to 15 Pa·s), jER828US (viscosity at 30° C.: 10 to 15 Pa·s), jER828XA (viscosity at 30° C.: 10 to 23 Pa·s), EPICLON 850 (viscosity at 30° C.: 10 to 15 Pa·s), and EPICLON 850-S (viscosity at 30° C.: 10 to 15 Pa·s) manufactured by Mitsubishi Chemical Corporation as bisphenol A type epoxy resins.

<Component (B)>

The component (B) is an aliphatic ester compound having a freezing point of 50° C. or lower.

Here, the freezing point of the aliphatic ester compound is a freezing point measured according to JIS K 0065: 1992 "Method for measuring freezing point of chemical products".

The freezing point of the aliphatic ester compound as the component (B) is not particularly limited as long as the freezing point is 50° C. or lower.
When the freezing point of the aliphatic ester compound which is the component (B) is 50° C. or lower, the separation property of the reinforcement fiber tow (in particular, the carbon fiber tow), in which a plurality of sub-tows are bonded with the sizing agent of the present invention, during chopping is excellent.

The upper limit of the freezing point of the aliphatic ester compound which is the component (B) is preferably 30° C. or lower, and more preferably 15° C. or lower since the separation property of the reinforcement fiber tow (in particular, the carbon fiber tow), in which a plurality of sub-tows are bonded with the sizing agent of the present invention, during chopping is superior.

The lower limit of the freezing point of the aliphatic ester compound as the component (B) is preferably −30° C. or higher, more preferably −20° C. or higher, and even more preferably −10° C. or higher since the chopping property of the reinforcement fiber tow (in particular, the carbon fiber tow), in which a plurality of sub-tows are bonded with the sizing agent of the present invention, during chopping is improved.

The numerical range of the freezing point of the aliphatic ester compound which is the component (B) is preferably −30 to 50° C., more preferably −20 to 30° C., and even more preferably −10 to 15° C. When the freezing point is in this range, the chopping property and the separation property of the reinforcement fiber tow (in particular, the carbon fiber tow), in which a plurality of sub-tows are bonded with the sizing agent of the present invention, during chopping are superior.

The component (B) may be any aliphatic ester compound having a freezing point of 50° C. or lower and one type of aliphatic ester compound may be used alone, or two or more types of aliphatic ester compounds may be used in combination.

The component (B) preferably comprises an aliphatic ester compound having one or two ester bonds in the molecule, and more preferably comprises an aliphatic ester compound having one ester bond in the molecule.

When the component (B) comprises the aliphatic ester compound having one or two ester bonds in the molecule, the frictional resistance between the reinforcement fibers (in particular, carbon fibers) is reduced, and when the component (B) comprises the aliphatic ester compound having one ester bond in the molecule, the frictional resistance between the reinforcement fibers (in particular, carbon fibers) is further reduced.

Aliphatic ester compounds having one ester bond in the molecule are, for example, 2-ethylhexyl stearate, methyl stearate, butyl stearate, and isopropyl palmitate.

Aliphatic ester compounds having two ester bonds in the molecule are, for example, isobutyl adipate and 2-ethylhexyl adipate.

The component (B) may comprise an aliphatic ester compound having three or more ester bonds in the molecule. Aliphatic ester compounds having three or more ester bonds in the molecule are, for example, 1,2,3-propanetricarboxylic acid ester and 1,3,5-cyclohexanetricarboxylic acid ester.

<Component (C)>

In addition to the component (A) and the component (B), the sizing agent of the present invention may include other components than the component (A) and the component (B). The component (C) is, for example, a surfactant, a urethane resin, a polyester resin, or a polyamide resin.

As the component (C), one type may be used alone, or two or more types may be used in combination.

<Content of Component (A) and Component (B)>

The ratio (mass ratio A/B) of the mass A of the component (A) with respect to the mass B of the component (B) in the sizing agent of the present invention is 0.5 to 20.

When the mass ratio A/B is 0.5 or more, the chopping property of the reinforcement fiber tow (in particular, the carbon fiber tow), in which a plurality of sub-tows are bonded with the sizing agent of the present invention, during chopping is excellent.

When the mass ratio A/B is 20 or less, the separation property of the reinforcement fiber tow (in particular, the carbon fiber tow), in which a plurality of sub-tows are bonded with the sizing agent of the present invention, during chopping is excellent.

The numerical range of the mass ratio A/B is preferably 1 to 10, more preferably 1.5 to 8, and even more preferably 3 to 5.

When the mass ratio A/B is in this range, the chopping property and the separation property of the reinforcement fiber tow (in particular, the carbon fiber tow), in which a plurality of sub-tows are bonded with the sizing agent of the present invention, during chopping are superior.

The total content of the component (A) and the component (B) in the sizing agent of the present invention is 80% by mass or more as the proportion of the total mass of the component (A) and the component (B) with respect to the total mass of the sizing agent of the present invention.

The lower limit of the proportion of the total mass of the component (A) and the component (B) with respect to the total mass of the sizing agent of the present invention is not particularly limited as long as the lower limit is 80% by mass or more, but 85% by mass or more is preferable.

When the proportion of the total mass of the component (A) and the component (B) with respect to the total mass of the sizing agent of the present invention is 80% by mass or more, the chopping property and separation property of the reinforcement fiber tow (in particular, the carbon fiber tow), in which a plurality of sub-tows are bonded with the sizing agent of the present invention, during chopping are excellent, and when 85% by mass or less, the chopping property and separation property are superior.

The upper limit of the proportion of the total mass of the component (A) and the component (B) with respect to the total mass of the sizing agent of the present invention is not particularly limited, but is usually 100% by mass or less, and, since the stability of the sizing agent of the present invention is further improved, 95% by mass or less is preferable, and 90% by mass or less is more preferable.

The numerical range of the proportion of the total mass of the component (A) and the component (B) with respect to the total mass of the sizing agent of the present invention is preferably 80 to 100% by mass, more preferably 80 to 95% by mass, and even more preferably 85 to 90% by mass.

When the proportion of the total mass of the component (A) and the component (B) with respect to the total mass of the sizing agent of the present invention is in this range, the chopping property and separation property of the reinforcement fiber tow (in particular, the carbon fiber tow), in which a plurality of sub-tows are bonded with the sizing agent of the present invention, during chopping are excellent, and the stability of the sizing agent of the present invention is improved.

<Method for Manufacturing Sizing Agent>

The method for manufacturing the sizing agent of the present invention is not particularly limited and examples thereof include a method of mixing the component (A) and the component (B), and as desired, the component (C), by a known method.

[Reinforcement Fiber Tow]

The reinforcement fiber tow of the present invention comprises a plurality of sub-tows bonded to each other by the sizing agent described above.

<Reinforcement Fiber>

The reinforcement fibers forming the reinforcement fiber tow of the present invention are not particularly limited and, for example, it is possible to use inorganic fibers, organic fibers, metal fibers, or hybrid-form reinforcement fibers combining the above.

Examples of inorganic fibers include carbon fiber, graphite fiber, silicon carbide fiber, alumina fiber, tungsten carbide fiber, boron fiber, glass fiber, and the like. Examples of organic fibers include aramid fiber, high-density polyethylene fiber, other general nylon fiber, polyester fiber, and the like. Examples of metal fibers include fibers such as stainless steel and iron and may also include carbon fibers coated with metal. As these fibers, one type may be used alone, or two or more types may be used in combination, but among the above, carbon fibers are particularly preferable in consideration of mechanical properties such as the strength of the composite material molded product. Examples of the carbon fibers include polyacrylonitrile (PAN)-based carbon fibers, rayon-based carbon fibers, pitch-based carbon fibers, and the like.

In addition, the length of the reinforcement fiber tow of the present invention is not particularly limited and can be appropriately set according to the intended use.

<Sub-Tow>

The reinforcement fiber tow of the present invention comprising a plurality of sub-tows bonded to each other by the sizing agent described above makes the processability during manufacturing and processing of the reinforcement fiber tow excellent and the separation property of the reinforcement fiber tow during chopping excellent.

The reinforcement fiber tow comprising a plurality of sub-tows may be one in which a plurality of separately manufactured sub-tows are bundled.

In addition, it may be one made by splitting a large tow into a plurality of sub-tows and bundling them.

In particular, in a case where the reinforcement fiber tow of the present invention is a carbon fiber tow, it also may be one in which the adjacent sub-tows are intermittently split. By locally having an unsplit portion between the adjacent sub-tows in this way, the reinforcement fiber tow has further improved productivity and shape stability during processing.

The number of sub-tows contained in this reinforcement fiber tow is not particularly limited and can be, for example, 2 to 50.

In addition, the total number of filaments of this reinforcement fiber tow is usually approximately 1,000 to 120,000. The number of filaments of a sub-tow is usually approximately 500 to 60,000.

<Amount of Sizing Agent>

The amount of the sizing agent is 0.6 to 1.6% by mass with respect to the total mass of the reinforcement fiber tow.

When the amount of the sizing agent is 0.6% by mass or more, the chopping property of the reinforcement fiber tow (in particular, the carbon fiber tow), in which a plurality of sub-tows are bonded with the sizing agent of the present invention, during chopping is excellent. The lower limit of the amount of the sizing agent is preferably 0.8% by mass or more, and more preferably 1.0% by mass or more.

When the amount of the sizing agent is 1.6% by mass or less, the separation property of the reinforcement fiber tow (in particular, the carbon fiber tow), in which a plurality of sub-tows are bonded with the sizing agent of the present invention, during chopping is excellent. The upper limit of the amount of the sizing agent is preferably 1.4% by mass or less, and more preferably 1.2% by mass or less.

The numerical range of the amount of the sizing agent is preferably 0.8 to 1.4% by mass, and more preferably 1.0 to 1.2% by mass. When the amount of the sizing agent is in this range, the chopping property and the separation property of the reinforcement fiber tow (in particular, the carbon fiber tow), in which a plurality of sub-tows are bonded with the sizing agent of the present invention, during chopping are superior.

<Proportion Q>

In addition, the reinforcement fiber tow of the present invention is a continuous reinforcement fiber tow comprising a plurality of sub-tows bonded to each other by a sizing agent and the proportion Q of the separation property defined below is 20% or more.

Proportion Q:

A continuous reinforcement fiber tow is chopped (cut) at a length of 1 inch, 100 pieces of the chopped reinforcement fiber tows, each of which does not include any unsplit portion between the sub-tows, are carefully picked up with a pair of tweezers at random, and a mass of each is measured. From these 100 mass measurement values, the number of chopped reinforcement fiber tows corresponding to the mass of the sub-tow is counted and the proportion Q of the number is calculated.

Here, the exclusion of chopped reinforcement fiber tow including no unsplit portion between sub-tows means that, for example, in a case of obtaining a chopped reinforcement fiber tow by chopping a reinforcement fiber tow in which a large tow is intermittently split into a plurality of sub-tows, the chopped reinforcement fiber tow in which the sub-tows are connected to each other due to the unsplit portion is excluded from the evaluation target of the proportion Q.

In addition, the chopped reinforcement fiber tow corresponding to the mass of the sub-tow is a chopped reinforcement carbon fiber tow having a mass of 120% or less of the mass corresponding to the average fineness of the sub-tow.

The higher the proportion Q, the better the separation property of the reinforcement fiber tow during chopping; however, if the proportion Q is 20% or more, adding a step such as blowing air to the chopped reinforcement fiber tow and causing the chopped reinforcement fiber tow to collide with a rotating body on which a plurality of protrusions are provided on the surface makes it possible to obtain a chopped reinforcement fiber tow sufficiently separated as a raw material of a fiber-reinforced resin-molding material. The proportion Q is preferably 20% or more, more preferably 40% or more, even more preferably 50% or more, and yet more preferably 60% or more.

The reinforcement fiber tow of the present invention having a proportion Q of 20% or more has an excellent chopping property and separation property during chopping.

For example, binding the plurality of sub-tows described above to each other with the sizing agent of the present invention makes it possible to set the proportion Q of the reinforcement fiber tows to 20% or more.

As described above, in the reinforcement fiber tow of the present invention, it is possible to set the adjacent sub-tows into an intermittently split state; however, in this case, the length of the unsplit portion between the adjacent sub-tows is preferably 1 to 35 mm.

When the lower limit of the length of the unsplit portion between adjacent sub-tows is 1 mm or more, it is possible to further improve the productivity of this reinforcement fiber tow and the shape stability during processing and it is easy to reduce problems in the steps where the fiber bundle is cut and wound on a rotary blade, a roll, or the like. 3 mm or more is more preferable, and 5 mm or more is even more preferable.

When the upper limit of the length of the unsplit portion between adjacent sub-tows is 50 mm or less, it is possible to reduce the proportion of the unsplit portion included in the chopped reinforcement fiber tow after cutting, and thereby, the physical properties of the product molded from the obtained molding material tends to be improved. 35 mm or less is more preferable, and 25 mm or less is even more preferable.

The numerical range of the length of the unsplit portion between the adjacent sub-tows is preferably 1 to 50 mm, more preferably 3 to 35 mm, and even more preferably 5 to 25 mm.

Examples of methods for setting the adjacent sub-tows into an intermittently split state include a method of intermittently piercing a continuous large tow with a plurality of consecutive blades arranged at predetermined intervals in the width direction of the large tow, a method of intermittently blowing a fluid such as air to a plurality of locations in the width direction of the continuous large tow, and the like.

It is possible to use the reinforcement fiber tow of the present invention as a raw material for a fiber-reinforced resin-molding material and the reinforcement fiber tow of the present invention is particularly useful as a reinforcement fiber tow for a sheet-molding compound (also referred to below as "SMC") since the chopping property and separation property during chopping are excellent.

By using the reinforcement fiber tow of the present invention an SMC in which fine reinforcement fiber tows generated by uniform separation are dispersed may be obtained; thus, variation in the quality thereof is reduced and, in particular, the fiber-reinforced composite material obtained from the SMC using a carbon fiber as a reinforcement fiber is excellent in mechanical properties.

<Method for Manufacturing Reinforcement Fiber Tow>

The method for manufacturing the reinforcement fiber tow of the present invention is not particularly limited. Examples thereof include a method in which the sizing agent of the present invention is added to water, emulsified to obtain an aqueous dispersion, and the aqueous dispersion is applied on a reinforcement fiber tow and dried. After applying the aqueous dispersion containing the sizing agent and before drying, the reinforcement fiber tow containing the aqueous dispersion may be squeezed with a nip roller or the like to adjust the content of the aqueous dispersion.

The applying method is not particularly limited and examples thereof include a dipping method, a spray method, a touch roll method, and the like.

The drying method is not particularly limited and examples thereof include a method of contacting a heating roller, a method of passing through a heated furnace, and the like.

It is possible to adjust the amount of the sizing agent by the concentration of the sizing agent in the aqueous dispersion, the degree of squeezing after immersion, and the like.

The concentration of the sizing agent in the aqueous dispersion is preferably 20 to 60% by mass, and more preferably 30 to 50% by mass. When the concentration of the sizing agent is the lower limit value of the above range or more, the amount of the sizing agent in the aqueous dispersion is large, which is economical during transportation. When the concentration of the sizing agent is the upper limit value of the above range or less, it is possible to obtain a stable aqueous dispersion.

Fiber-Reinforced Resin-Molding Material

The fiber-reinforced resin-molding material of the present invention is a material in which a fiber tow resulting from cutting the reinforcement fiber tow described above at an interval in the longitudinal direction (also referred to below as a "chopped fiber tow") is impregnated with a resin (matrix resin).

The fiber-reinforced resin-molding material of the present invention is preferably a sheet-molding compound (SMC). The SMC of the present invention may have known aspects as long as it comprises a chopped fiber tow chopped from the reinforcement fiber tow of the present invention.

The average fiber length of the chopped fiber tow is not particularly limited and can be, for example, 1 to 60 mm. The average fiber length of the chopped fiber tow is the average value of the fiber lengths of 100 chopped fiber tows.

As the matrix resin, it is possible to use a thermosetting resin and a thermoplastic resin. As the matrix resin, only the thermosetting resin may be used, only the thermoplastic resin may be used, or both the thermosetting resin and the thermoplastic resin may be used.

The thermosetting resin is not particularly limited and examples thereof include an epoxy resin, a phenol resin, an unsaturated polyester resin, a vinyl ester resin, a phenoxy resin, an alkyd resin, a urethane resin, a urea resin, a melamine resin, a maleimide resin, a cyanate resin, and the like.

Examples of thermoplastic resins include a polyolefin resin, a polyamide resin, a polyester resin, a polyphenylene sulfide resin, a polyether ketone resin, a polyether sulfone resin, an aromatic polyamide resin, and the like.

As the matrix resin, one type may be used alone, or two or more types may be used in combination.

Matrix resins may be blended with additives such as internal mold release agents, defoaming agents, flame retardants, weather resistance improvers, antioxidants, heat stabilizers, UV absorbers, plasticizers, lubricants, colorants, compatibilizers, and thickeners.

The method for manufacturing the fiber-reinforced resin-molding material of the present invention is not particularly limited. Examples thereof include a method in which a long reinforcement fiber tow of the invention is chopped into chopped fiber tows, a fiber base material comprising the chopped fiber tows is formed, and the fiber base material is impregnated with a matrix resin to obtain a fiber-reinforced resin-molding material.

Fiber-Reinforced Composite Material

The fiber-reinforced composite material of the present invention is obtained from the fiber-reinforced resin-molding material described above.

As described above, in the present invention, by using a sizing agent including the component (A) and the component (B) in a specific ratio, both an excellent chopping property and separation property in the reinforcement fiber tow during chopping are achieved. In particular, in a reinforcement fiber tow comprising a plurality of sub-tows, bonding the sub-tows to each other with the sizing agent of the present invention makes it possible to obtain a particularly excellent separation property while ensuring an excellent chopping property. In addition, in the fiber-reinforced resin-molding material represented by SMC, by using a chop of the reinforcement fiber tow of the invention as the reinforcement fiber, variation in the quality thereof is reduced and the mechanical properties of the fiber-reinforced composite material obtained by using this fiber-reinforced resin-molding material are excellent.

EXAMPLES

A description will be given below of the present invention using Examples. However, the present invention is not limited to the Examples described below and it is possible to make various modifications as long as the gist of the present invention is not changed.

[Raw Material]

The raw materials used in this example are shown below.

<Component (A)>

Component (A-1): Bisphenol A novolak type epoxy resin (trade name "E157S70", Mitsubishi Chemical Corporation, softening point: 70° C.).

Component (A-2): Bisphenol F type epoxy resin (trade name "jER807", Mitsubishi Chemical Corporation, viscosity at 30° C.: 2 Pa·s).

<Component (B)>

Component (B-1): 2-ethylhexyl stearate (trade name "Exceparl EH-S", Kao Corporation, freezing point: 10° C.).

<Component (C)>

Surfactant (C-1): Polycyclic phenol ethylene oxide adduct sulfate ester ammonium salt (trade name "Hitenol NF-17", DKS Co., Ltd.).

[Amount of Sizing Agent]

Amount of a sizing agent in a carbon fiber tow comprising the sizing agent obtained in each Example was measured by the Soxhlet extraction method using methyl ethyl ketone. The extraction time was 1 hour.

[Evaluation of Chopping Property and Separation Property]

Using a rotary cutter, a sized carbon fiber tow was chopped (cut) to a length of 1 inch and the chopping property and separation property were evaluated by the following method.

<Chopping Property>

The state of the chopped carbon fiber tow adhering to the rubber roll of the rotary cutter was visually confirmed and the chopping property was evaluated according to the following criteria.

A: There was almost no adhering of the chopped carbon fiber tows to the rubber roll and continuous chopping was possible.

B: Some adhering of the chopped carbon fiber tows to the rubber roll was seen, but continuous chopping was possible.

C: There was a lot of adhering of the chopped carbon fiber tows to the rubber roll and continuous chopping was difficult.

<Separation Property>

A chopped carbon fiber tow not including unsplit portions between the sub-tows was carefully picked up with a pair of tweezers and the mass thereof was measured. Mass measurement was performed with respect to 100 chopped carbon fiber tows, the number of chopped carbon fiber tows corresponding to the mass of the total number of filaments of 3,000 carbon fiber tows was counted, the proportion Q of the number was calculated, and the separation property was evaluated according to the following criteria.

A: Proportion Q is 60% or more.
B: Proportion Q is 50% or more and less than 60%.
C: Proportion Q is 40% or more and less than 50%.
D: Proportion Q is 20% or more and less than 40%
E: Proportion Q is less than 20%.

Example 1

<Preparation of Aqueous Dispersion of Sizing Agent>

An epoxy resin in which 62 parts by mass of component (A-1) and 13 parts by mass of component (A-2) were mixed as the component (A), 10 parts by mass of the component (B-1), and 15 parts by mass of the surfactant (C-1) were mixed to obtain a sizing agent. Ion-exchanged water was added to the sizing agent and an aqueous dispersion having a sizing agent concentration of 30% by mass was prepared by phase inversion emulsification using a homomixer.

<Manufacturing of Carbon Fiber Tow Containing Sizing Agent>

An acrylonitrile-based copolymer was wet-spun to obtain a carbon fiber tow precursor having 3,000 filaments and a total fineness of 3,600 tex and five of the above were bundled and wound on a bobbin. The bundled carbon fiber tow precursor was fired to obtain a carbon fiber tow having a total number of filaments of 15,000 and a total fineness of 1,000 tex, comprising 5 sub-tows. Next, the carbon fiber tow was subjected to an electrolytic oxidization process with ammonium hydrogen carbonate as an electrolytic solution, washed with water, and dried by a roller heated to 150° C. Next, the surface-treated carbon fiber tow was immersed in and passed through the aqueous dispersion of the sizing agent filled in an immersion tank via a roller, the aqueous dispersion was squeezed using a nip roller and then dried by contact with a roller heated to 150° C. for 20 seconds, and the sized carbon fiber tow was wound on a bobbin. The amount of the sizing agent in the obtained sized carbon fiber tow was 1.0% by mass.

Examples 2 to 12

Sized carbon fiber tows were manufactured in the same manner as in Example 1 except that the compositions of the sizing agent and the amounts of the sizing agent were changed as shown in Table 1. The amount of the sizing agent was adjusted by adjusting the concentration of the sizing agent in the aqueous dispersion.

Example 13

A carbon fiber tow (trade name "TR50S 15L", manufactured by Mitsubishi Chemical Corporation) was used as a continuous fiber tow. The carbon fiber tow was intermittently split such that the length of the split portion between adjacent sub-tows was 16 mm and a carbon fiber tow comprising 5 sub-tows was obtained in which the total number of filaments was 15,000 and the total fineness was 1,000 tex. Next, a sized carbon fiber tow was manufactured in the same manner as in Example 2.

Comparative Example 1

A sized carbon fiber tow was manufactured in the same manner as in Example 1 except that the composition of the sizing agent and the amount of the sizing agent were changed as shown in Table 1. The amount of the sizing agent was adjusted by adjusting the concentration of the sizing agent in the aqueous dispersion.

Table 1 shows the evaluation results in the Examples and Comparative Examples.

sufficient in practice in both chopping property and separation property during chopping.

In addition, as shown in Table 1, in Example 9 in which the mass ratio A/B was relatively small, in Examples 10 and 11 in which the viscosity of the epoxy resin was relatively low, and in Example 12 in which the viscosity of the epoxy resin was relatively high, the separation property was at a normal to practical level.

On the other hand, in Comparative Example 1 in which the sizing agent did not include the component (B), the separation property during chopping was insufficient.

What is claimed is:

1. A sizing agent, comprising:
    a component (A); and
    a component (B)
    wherein a mass ratio A/B of the component (A) to the component (B) is 0.5 to 10, and a proportion of a total mass of the component (A) and the component (B) with respect to a total mass of the sizing agent is 85% by mass or more,
    wherein the component (A) is an epoxy resin having a viscosity of 500 to 180,000 Pa·s at 30° C., and the component (B) is an aliphatic ester compound having a freezing point of 50° C. or lower.

TABLE 1

|  |  |  |  | Examples | | | | | | |
|---|---|---|---|---|---|---|---|---|---|---|
|  |  |  |  | 1 | 2 | 3 | 4 | 5 | 6 | 7 |
| Sizing agent | Component (A) | A-1 | [parts by mass] | 62 | 54 | 45 | 66 | 41 | 40 | 54 |
|  |  | A-2 | [parts by mass] | 13 | 11 | 10 | 14 | 9 | 25 | 11 |
|  |  | Viscosity | [Pa·s] | 111000 | 111000 | 111000 | 111000 | 111000 | 3180 | 111000 |
|  | Component (B) | B-1 | [parts by mass] | 10 | 20 | 30 | 5 | 35 | 20 | 20 |
|  |  | Freezing point | [° C.] | 10 | 10 | 10 | 10 | 10 | 10 | 10 |
|  | Component (C) | C-1 | [parts by mass] | 15 | 15 | 15 | 15 | 15 | 15 | 15 |
|  | Component (A)/Component (B) |  |  | 7.5 | 3.3 | 1.8 | 16.0 | 1.4 | 3.3 | 3.3 |
|  | Component (A) + Component (B) |  | [% by mass] | 85 | 85 | 85 | 85 | 85 | 85 | 85 |
| Carbon fiber tow | Sizing agent amount |  | [%] | 1.0 | 1.0 | 1.0 | 1.0 | 1.0 | 1.0 | 0.7 |
|  | Evaluation | Chopping property |  | A | A | A | A | B | A | B |
|  |  | Q | [%] | 53 | 64 | 51 | 42 | 58 | 55 | 57 |
|  |  | Separation property |  | B | A | B | C | B | B | B |

|  |  |  |  | Examples | | | | | | Comparative |
|---|---|---|---|---|---|---|---|---|---|---|
|  |  |  |  | 8 | 9 | 10 | 11 | 12 | 13 | Examples 1 |
| Sizing agent | Component (A) | A-1 | [parts by mass] | 54 | 29 | 0 | 20 | 60 | 54 | 70 |
|  |  | A-2 | [parts by mass] | 11 | 6 | 65 | 45 | 5 | 11 | 15 |
|  |  | Viscosity | [Pa·s] | 111000 | 111000 | 3.0 | 21.5 | 130000 | 111000 | 111000 |
|  | Component (B) | B-1 | [parts by mass] | 20 | 50 | 20 | 20 | 20 | 20 | 0 |
|  |  | Freezing point | [° C.] | 10 | 10 | 10 | 10 | 10 | 10 | — |
|  | Component (C) | C-1 | [parts by mass] | 15 | 15 | 15 | 15 | 15 | 15 | 15 |
|  | Component (A)/Component (B) |  |  | 3.3 | 0.7 | 3.3 | 3.3 | 3.3 | 3.3 | — |
|  | Component (A) + Component (B) |  | [% by mass] | 85 | 85 | 85 | 85 | 85 | 85 | 85 |
| Carbon fiber tow | Sizing agent amount |  | [%] | 1.4 | 1.0 | 1.0 | 1.0 | 1.0 | 1.4 | 1.0 |
|  | Evaluation | Chopping property |  | A | C | C | C | A | A | A |
|  |  | Q | [%] | 45 | 42 | 32 | 45 | 27 | 56 | 10 |
|  |  | Separation property |  | C | C | D | C | D | B | E |

In Table 1, "component (A)/component (B)" represents the mass ratio of the component (A) to the component (B), while "component (A)+component (B)" represents the proportion of the total mass of the component (A) and the component (B) with respect to the total mass of the sizing agent.

As shown in Table 1, the sized carbon fiber tows of Examples 1 to 13 to which the sizing agent of the present invention was attached in an appropriate amount were 2. The sizing agent according to claim 1, wherein an epoxy resin having a softening point of 50° C. or higher is blended in the component (A).

3. The sizing agent according to claim 2, wherein the epoxy resin having a softening point of 50° C. or higher comprises a bisphenol A novolak type epoxy resin, a phenol novolak type epoxy resin, or a dicyclopentadiene type epoxy resin.

4. The sizing agent according to claim 2, wherein an epoxy resin staying in a liquid state at 30° C. is blended in the component (A).

5. The sizing agent according to claim 4, wherein the epoxy resin staying in a liquid state at 30° C. comprises a bisphenol F type epoxy resin or a bisphenol A type epoxy resin.

6. The sizing agent according to claim 1, wherein the component (B) comprises an aliphatic ester compound having one or two ester bonds in a molecule.

7. The sizing agent according to claim 1, wherein the sizing agent further comprises a surfactant, a urethane resin, a polyester resin, or a polyamide resin.

8. A reinforcement fiber tow comprising a carbon fiber tow sized with the sizing agent according to claim 1.

9. The reinforcement fiber tow according to claim 8, wherein the carbon fiber tow comprises a plurality of sub-tows.

10. A reinforcement fiber tow comprising a carbon fiber tow comprising a plurality of sub-tows bonded to each other with the sizing agent according to claim 1.

11. The reinforcement fiber tow according to claim 10, wherein an amount of the sizing agent is 0.6 to 1.6% by mass with respect to a total mass of the reinforcement fiber tow.

12. The reinforcement fiber tow according to claim 10, wherein adjacent sub-tows in the plurality of sub-tows are in an intermittently split state.

13. A fiber-reinforced resin-molding material in which a fiber tow resulting from cutting the reinforcement fiber tow according to claim 10 at an interval in a longitudinal direction is impregnated with a resin.

14. The fiber-reinforced resin-molding material according to claim 13, which is a sheet-molding compound.

15. A fiber-reinforced composite material which is molded from the fiber-reinforced resin-molding material according to claim 13.

16. An aqueous dispersion containing the sizing agent according claim 1 dispersed therein.

17. A method of manufacturing a sizing agent, comprising blending a component (A) with a component (B) such that a mass ratio A/B of the component (A) to the component (B) is 0.5 to 20, and a proportion of a total mass of the component (A) and the component (B) with respect to a total mass of the sizing agent is 85% by mass or more, wherein the component (A) is an epoxy resin having a viscosity of 1 to 180,000 Pa·s at 30° C., and the component (B) is an aliphatic ester compound having a freezing point of 50° C. or lower.

18. The method according to claim 17, wherein an epoxy resin having a softening point of 50° C. or higher is blended in the component (A).

19. The method according to claim 18, wherein an epoxy resin staying in a liquid state at 30° C. is blended in the component (A).

20. A reinforcement fiber tow, which is a carbon fiber tow sized with a sizing agent,
wherein the carbon fiber tow comprises a plurality of sub-tows,
wherein the sizing agent comprises:
a component (A); and
a component (B),
wherein a mass ratio A/B of the component (A) to the component (B) is 0.5 to 10, and a proportion of a total mass of the component (A) and the component (B) with respect to a total mass of the sizing agent is 80% by mass or more, and
wherein the component (A) is an epoxy resin having a viscosity of 500 to 180,000 Pa·s at 30° C., and the component (B) is an aliphatic ester compound having a freezing point of 50° C. or lower.

21. A reinforcement fiber tow, which is a chopped carbon fiber tow sized with a sizing agent,
wherein the chopped carbon fiber tow comprises a plurality of sub-tows, and
wherein the sizing agent comprises:
a component (A); and
a component (B),
wherein a mass ratio A/B of the component (A) to the component (B) is 0.5 to 10, and a proportion of a total mass of the component (A) and the component (B) with respect to a total mass of the sizing agent is 80% by mass or more, and
wherein the component (A) is an epoxy resin having a viscosity of 500 to 180,000 Pa·s at 30° C., and the component (B) is an aliphatic ester compound having a freezing point of 50° C. or lower.

* * * * *